US007098860B2

(12) United States Patent
Kaluzni et al.

(10) Patent No.: US 7,098,860 B2
(45) Date of Patent: Aug. 29, 2006

(54) HIGH PERFORMANCE LOW COST DIPOLE ANTENNA FOR WIRELESS APPLICATIONS

(75) Inventors: Heiko Kaluzni, Grossenhain (DE); Michael Wendt, Haselbachtel (DE); Ralf Klukas, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 11/009,633

(22) Filed: Dec. 10, 2004

(65) Prior Publication Data

US 2005/0168397 A1 Aug. 4, 2005

(30) Foreign Application Priority Data

Jan. 30, 2004 (DE) ..................... 10 2004 004 798

(51) Int. Cl.
*H01Q 9/28* (2006.01)
*G06K 5/00* (2006.01)

(52) U.S. Cl. ............................ 343/795; 343/700 MS; 343/803; 343/893; 343/895; 343/912

(58) Field of Classification Search ................ 343/795, 343/803, 893, 895, 912, 767, 700 MS, 793, 343/796, 810, 824
See application file for complete search history.

(56) References Cited

U.S. PATENT DOCUMENTS 6,549,170 B1 * 4/2003 Kuo et al. .................. 343/702
6,593,895 B1 * 7/2003 Nesic et al. ................ 343/795
6,624,790 B1 * 9/2003 Wong et al. ................ 343/702
6,842,158 B1 * 1/2005 Jo et al. ..................... 343/895
6,906,678 B1 * 6/2005 Chen .......................... 343/795
6,975,278 B1 * 12/2005 Song et al. ................. 343/795
2004/0100407 A1 * 5/2004 Okado ................. 343/700 MS

FOREIGN PATENT DOCUMENTS

DE 69015678 T2 4/1990
GB 2 259 811 A 3/1993

* cited by examiner

*Primary Examiner*—Tho Phan
*Assistant Examiner*—Chuc Tran
(74) *Attorney, Agent, or Firm*—Williams, Morgan & Amerson

(57) ABSTRACT

A printed dipole antenna comprises bent dipole arms connected to respective feed lines formed on opposed surfaces of a substrate. In one particular embodiment, the dipole antenna is provided as a folded dipole, including two or more connector lines to provide an increased frequency range. Two of these dipole antennae may advantageously be combined to an antenna system having a superior radiation characteristic in that the two dipole antennae are arranged to have a different orientation. A corresponding circuitry may then select the antenna, which provides superior operation at a given time.

33 Claims, 7 Drawing Sheets

HIGH PERFORMANCE LOW COST DIPOLE ANTENNA FOR WIRELESS APPLICATIONS

BACKGROUND OF THE INVENTION

1. Field of the Invention

Generally, the present invention relates to printed antennas used in combination with devices for wireless data communication, and, more particularly, to a printed dipole antenna and devices, such as WLAN devices, mobile phones and the like, requiring compact and efficient antennas.

2. Description of the Related Art

Currently great efforts are being made to develop wireless data communication devices offering a high degree of reliability at low cost. A key issue in this respect is the degree of integration with which a corresponding transceiver device may be manufactured. While for many applications, such as direct broadcast satellite (DBS) receivers and WLAN devices, this is of great importance due to cost effectiveness, in other applications such as mobile phones, mobile radio receivers and the like, low power consumption is of primary concern.

Presently, two major architectures for receiver devices are competing on the market, i.e., the so-called direct conversion architecture and the so-called super-heterodyne architecture. Due to the higher degree of integration and the potential for reduction of power consumption, the so-called direct conversion architecture seems to have become the preferred topography compared to the so-called super-heterodyne architecture. However, the advantages achieved by improving the circuit technology may become effective, irrespective of the circuit architecture used, only to an extent as is determined by the characteristics of an antenna required in the high frequency module of the device, wherein the size, the radiation characteristic and the involved production cost of the antenna are also essential criteria that have a great influence on the economic success of the wireless data communication device.

In a typical wireless application, such as a wireless data communication system using a LAN (local area network), usually the relative locations of communicating devices may change within a single communication session and/or from session to session. Hence, efficient methods and means have been developed to enhance reliability of the data transfer even for extremely varying environmental conditions, such as in the field of data communication with mobile phones. The overall performance of the wireless devices is, however, determined to a high degree by the properties of the antenna provided at the input/output side of the device. For instance, changing the orientation of a device may significantly affect the relative orientation of the polarization direction of the transmitter with respect to the receiver, which may result in a significant reduction of the field strength received in the receiver's antenna. For instance, changing the orientation of an initially horizontally radiating dipole antenna into the vertical orientation may lead to a reduction of the voltage generated by a horizontally oriented receiver antenna up to approximately 20 dB. Consequently, for non-stationary applications in the wireless data communication system, a substantially isotropic radiation characteristic, independent of the polarization direction, is desirable. On the other hand, with respect to portability and usability of the wireless devices, it is generally desirable that antennas for wireless data communication systems occupy as little volume within the device as possible and to substantially avoid design modifications in the form of, for example, protruding portions and the like. Therefore, increasingly, antennas are provided which are printed onto a dielectric substrate and connected to the drive/receive circuitry, wherein, in recent developments, the antenna is printed on a portion of the same substrate that also bears the system circuit. Although a moderately compact antenna design is achieved by conventional printed antennas, it turns out to be difficult to provide a highly isotropic characteristic of a dipole antenna when printed on a circuit board.

Therefore, a need exists for a printed dipole antenna exhibiting high performance with respect to a desired spatially isotropic radiation characteristic while allowing a low cost manufacturing process and a design requiring little substrate area.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, in one illustrative embodiment, the present invention is directed to a printed dipole antenna that provides superior radiation characteristics for wireless applications, such as WLAN applications, by a dipole design including bent dipole arms.

According to a further illustrative embodiment of the present invention, a printed dipole antenna system comprises a substrate having a first surface and a second surface and a first dipole antenna having a first orientation. The first dipole antenna includes a first feed line formed on the first surface and a second feed line formed on the second surface. Moreover, a first bent dipole arm is connected to the first feed line and a second bent dipole arm is connected to the second feed line by at least one contact via. The system further comprises a second dipole antenna having a second orientation and including a first feed line, a second feed line, a first bent dipole arm connected to the first feed line of the second antenna and a second bent dipole arm connected to the second feed line of the second dipole antenna.

According to still another illustrative embodiment of the present invention, a data communication device comprises a substrate having a first surface and a second surface and a printed dipole antenna. The dipole antenna includes a first feed line formed on the first surface and a second feed line formed on the second surface. A first bent dipole arm is connected to the first feed line and a second bent dipole arm is connected to the second feed line by at least one contact via. Furthermore, the data communication device comprises a drive/receive circuit formed on the substrate and connected to the first and second feed lines, wherein the drive/receive circuit is configured to supply and receive high frequency signals to and from the first and second feed lines.

BRIEF DESCRIPTION OF THE DRAWINGS

The invention may be understood by reference to the following description taken in conjunction with the accompanying drawings, in which like reference numerals identify like elements, and in which.

Figure 1A:
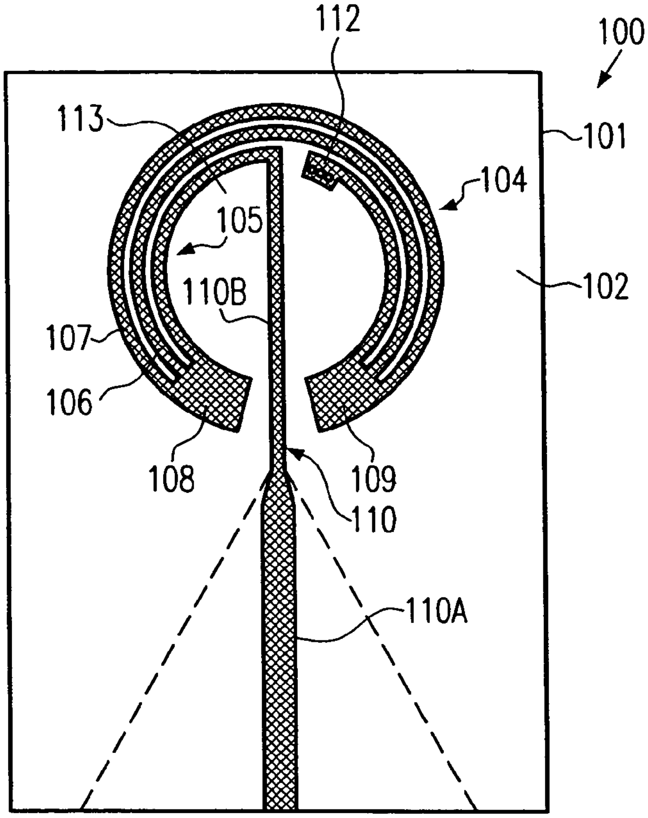
FIGS. 1*a*–1*c* schematically show top view of portions of a printed dipole antenna formed on a first and second substrate surface according to one illustrative embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In general, the present invention provides a printed dipole antenna having an enhanced radiation characteristic, wherein, at the same time, the layout of the antenna may be readily printed on substrates as are typically used for the fabrication of electronic devices. Consequently, in some embodiments, the printed dipole antenna according to the present invention may be formed in a common manufacturing process along with the wiring layout for circuitry required for operating the antenna. In other embodiments, the dipole antenna may be fabricated on corresponding substrates in an individual manufacturing process, wherein the dimensions of the dipole antenna may be adapted to a specified frequency range so that, for a variety of data communication devices, an appropriate antenna substrate for the frequency of interest may be readily selected. To this end, the antenna substrates and the electronic devices may have corresponding connector portions that allow external attachment of the antenna substrate to the device. In other embodiments, the appropriate antenna substrate may have contact electrodes or the like so that the antenna may be mounted onto the device substrate during a common manufacturing process for mounting electronic components.

With reference to the accompanying drawings, further illustrative embodiments of the present invention will now be described in more detail. FIG. 1*a* schematically shows a top view of a dipole antenna 100, while FIG. 1*c* depicts the dipole antenna 100 when viewed from the backside. The dipole antenna 100 comprises a substrate 101 having a first surface 102 (FIG. 1*a*) and a second surface 103 (FIG. 1*c*) opposite to the first surface 102. The substrate 101 may represent any appropriate dielectric substrate, such as an FR4 fiberglass reinforced epoxy resin substrate, a BT (bismaleimide-triazine) resin substrate, or a substrate made of polyimide. For instance, an FR4 substrate having a relative permittivity of approximately 4.4 with a thickness of approximately 0.8 mm may be used. The antenna 100 further comprises conductive lines, for instance formed of copper, with a thickness of, for example, 17.5 μm, which define a first bent dipole arm 104 and a second bent dipole arm 105. Providing dipole arms in the form of the bent dipole arms 104, 105 instead of a linear design results in improved isotropic radiation characteristics compared to a linear dipole design and at the same time enables significant reduction of the overall dimensions of the antenna 100 compared to dipole designs having linear dipole arms. In the embodiments shown in FIGS. 1*a* and 1*c*, the bent dipole arms 104, 105 are provided in a substantially circular, yet not completely closed, shape.

Figure 1B:
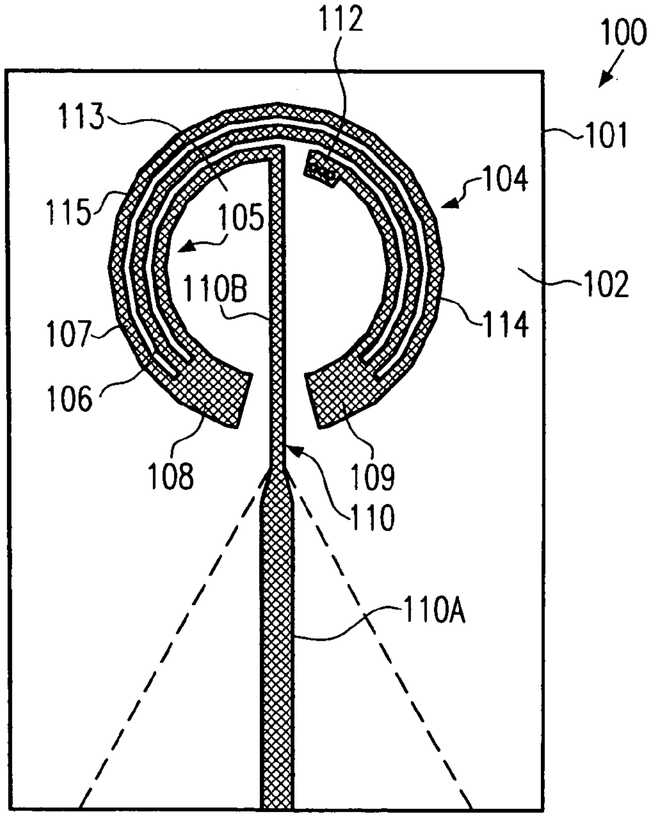
Figure 1C:
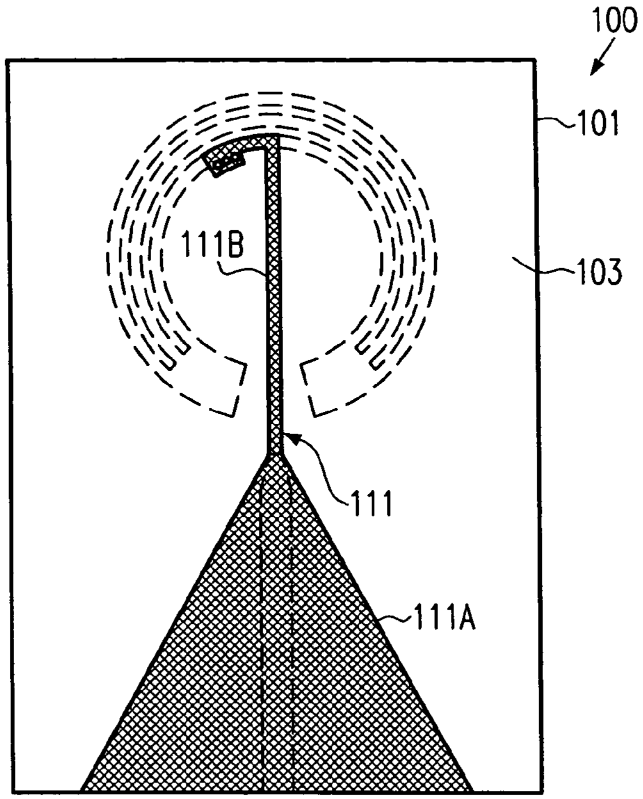

FIG. 1*b* illustrates another embodiment, wherein each of the bent dipole arms 104, 105 may contain a plurality of substantially linear portions 114, 115 that are combined with respective angles to each other to create a desired degree of curvature.

A length of the bent dipole arms 104, 105 is selected in conformity with the wavelength of the radiation under consideration. For instance, in the present example, the antenna 100 may be adapted to wireless LAN applications having a frequency range from approximately 2.25–2.65 GHz. Consequently, the dimensions of the bent dipole arms 104, 105 are selected to correspond, for instance, to the center frequency of 2.45 GHz, that is, the total length of the first and second bent dipole arms 104, 105 substantially corresponds to half of the wavelength of the center frequency, which is in the present example approximately 65 mm. It should be appreciated that the length of the dipole arms 104, 105 may be readily adapted to any other frequency ranges, such as, for example, that required for the WLAN operation, around 5.2 GHz. For example, for this frequency range, the radius of curvature may be accordingly decreased or, in other embodiments, the radius of curvature and the circular shape may be designed to have an opening that is wider as the one shown in FIG. 1*a*.

As is well known, increasing the width of a conductor forming a dipole arm may increase the bandwidth of the antenna. Hence, in one particular embodiment, as is also depicted in FIGS. 1*a* and 1*b*, the dipole design of the antenna 100 may be provided in the form of a folded dipole to broaden the frequency range of the antenna 100. To this end, one or more connector lines 106, 107 may be provided, which are connected at their respective ends to contact pads 108, 109, respectively, wherein the contact pads 108, 109 are also connected to the "open" ends of the first and second dipole arms 104, 105, respectively. The connector lines 106, 107 may, in one particular embodiment, be formed in a substantially concentric fashion with respect to the first and second dipole arms 104, 105.

The antenna 100 further comprises a first feed line 110, formed on the first surface 102, and a second feed line 111, formed on the second surface 103. The first feed line 110 is connected to the dipole arm 105, while the second feed line 111 is connected to the dipole arm 104 by means of one or more contact passages or vias 112. The first and second feed lines 110, 111 each comprise an increased portion 110*a*, 111*a*, respectively, which are correspondingly tapered to form a transition to respective elongated portions 110*b*, 111*b*, respectively, which in turn are connected to the respective dipole arms 104, 105. The elongated portion 110*b* is at least partially formed within an area 113 that is enclosed by the first and second dipole arms 104, 105. In one particular embodiment, the elongated portions 110*b* and 111*b* have substantially the same dimensions, i.e., substantially the same length and width, and are disposed in a parallel fashion with substrate 101 positioned therebetween to reduce radiation of the portions 110*a*, 111*b*. Furthermore, the increased portion 111*a* may cover an extended portion of the second surface 103, thereby also serving as a ground plane of the substrate 101.

The dipole antenna 100 may be formed by a conventional printing process, as is also used for manufacturing printed boards for high frequency circuitry, such as circuit boards for wireless LAN devices, mobile phones and the like. Hence, the dipole antenna 100 may be formed by well-established photolithography and etch techniques using a copper-coated substrate. The conductive portions of the antenna may also be formed by other materials, such as argentums, and the like, or surface areas of these portions may additionally be coated by any appropriate material. The dimensions of the conductive portions are formed with respect to dimensions and material composition according to well-known techniques to obtain the required impedance of these portions. In some embodiments, the substrate 101 may comprise respective connector portions (not shown) to connect the feed lines 110 and 111 with respective contact portions of a drive/receive circuit, which are also described with reference to FIG. 4. For example, the substrate 101 may be manufactured as a component having respective connector portions, which may then be attached to a printed circuit board by means of a surface mounting technique. Hence, a large number of various dipole antennae 100, each type adapted to a specified frequency range, may be manufactured at low cost, which may then be mounted on respective circuit devices during the usual surface mounting process, thereby providing a high degree of design flexibility for device manufacturer.

Figure 2:
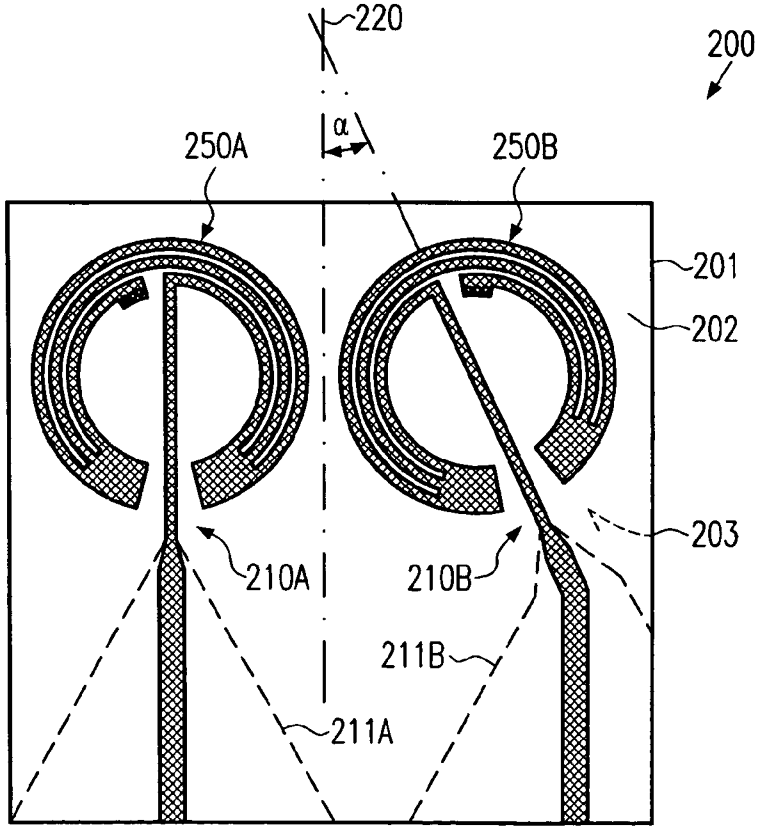
FIG. 2 schematically shows a top view of a dipole antenna system including two dipole antennae as shown in FIGS. 1*a*–1*c*, wherein a relative orientation of the two dipole antennae to each other is selected so as to achieve a superior isotropic radiation characteristic.

FIG. 2 schematically shows a top view of an antenna system including two dipole antennae similar to the antenna 100 shown in FIGS. 1*a* and 1*b*. The antenna system 200 comprises a substrate 201 having a first surface 202 and an opposed second surface 203. The substrate 201 may represent a substrate as is described with reference to FIGS. 1*a* and 1*b*. A first dipole antenna 250*a*, which may have the configuration as described with reference to FIGS. 1*a* and 1*b*, is formed in and on the substrate 201 with a first orientation with respect to a center line 220. A second dipole antenna 250*b* having a configuration as described with reference to FIGS. 1*a* and 1*b* is formed in and on the substrate 201 with a second orientation with respect to the center line 220, which differs from the orientation of the first dipole antenna 250*a*. Although the first and second antennae 250*a*, 250*b* are shown to have respective bent dipole arms that are formed on the first surface 202, in other embodiments, the dipole arms of the first or second dipole antenna 250*a*, 250*b* may be formed on the second surface 203. The same holds true for corresponding feed lines 210*a*, 210*b*, 211*a*, 211*b*. As shown in FIG. 2, the orientation of the second dipole antenna 250*b* with respect to the first dipole antenna 250*a* may differ in that the first dipole antenna 250*a* is mirror imaged with respect to the center line 220 and is then rotated with respect to an axis perpendicular to the first and second surfaces 202, 203 corresponding to an angle $\alpha$, as indicated in the drawing. In other embodiments, the orientation of the second dipole antenna 250*b* may be obtained by merely performing a rotation with respect to an axis perpendicular to the surfaces 202 and 203 to obtain the angle $\alpha$. Similarly, when the second dipole antenna 250*b* is formed with its respective bent dipole arms on the second surface 203, an orientation equivalent to that shown may be obtained by rotating the second antenna 250*b* without mirror imaging the design thereof.

It should be noted that the antenna system 200 as shown in FIG. 2*a* may not necessarily be formed on a common substrate. In some embodiments, it may be considered appropriate to provide the substrate 201 by two or more substrate portions, such as the substrate 101, which may have formed thereon dipole antennae, such as the antenna 100, with different orientations with respect to the substrate 101, or wherein the different substrates 101 have a different shape and/or connector portions that enable the antennae to be mounted on a substrate with different orientations, or to be combined to the substrate 201, to obtain the desired difference in orientation of the antennae 250*a*, 250*b*. For example, as previously explained, the substrate 101 may have formed thereon appropriate connector portions, which may additionally be provided such that a different orientation may be achieved upon attaching the substrate 101 to a corresponding circuit board. In this way, substantially the same circuit design may be used to provide an enhanced radiation characteristic, wherein the characteristic may be adjusted by correspondingly selecting, orienting and finally mounting the individual substrates 101 to form the substrate 201. Hence, by combining two dipole antennae, such as the antennae 100, to a system, such as the system 200, the enhanced radiation characteristics of a single dipole antenna may be further enhanced in accordance with application specific requirements.

With reference to FIGS. 3*a*–3*d*, typical measurement results will now be described for the system 200, formed on a single substrate 201, with an orientation of the first and second dipole antennae 250*a*, 250*b*, as is shown in FIG. 2. The measurement was performed by using a directive antenna of 19.25 dBi (dB isotropic) gain with a distance of 6.83 m to obtain absolute gain figures of the antennae 250*a*, 250*b*. The relative position of the transmitter antenna and the dipole antenna system 200 was varied in the vertical (v) and horizontal (h) direction corresponding to the coordinate system 300, wherein also the polarization direction of the transmitter antenna was changed between a horizontal and a vertical polarization. The measurement results represent the average of 68 frequency points in the range of 2.25–2.65 GHz for a center frequency of approximately 2.45 GHz.

Figure 3A:
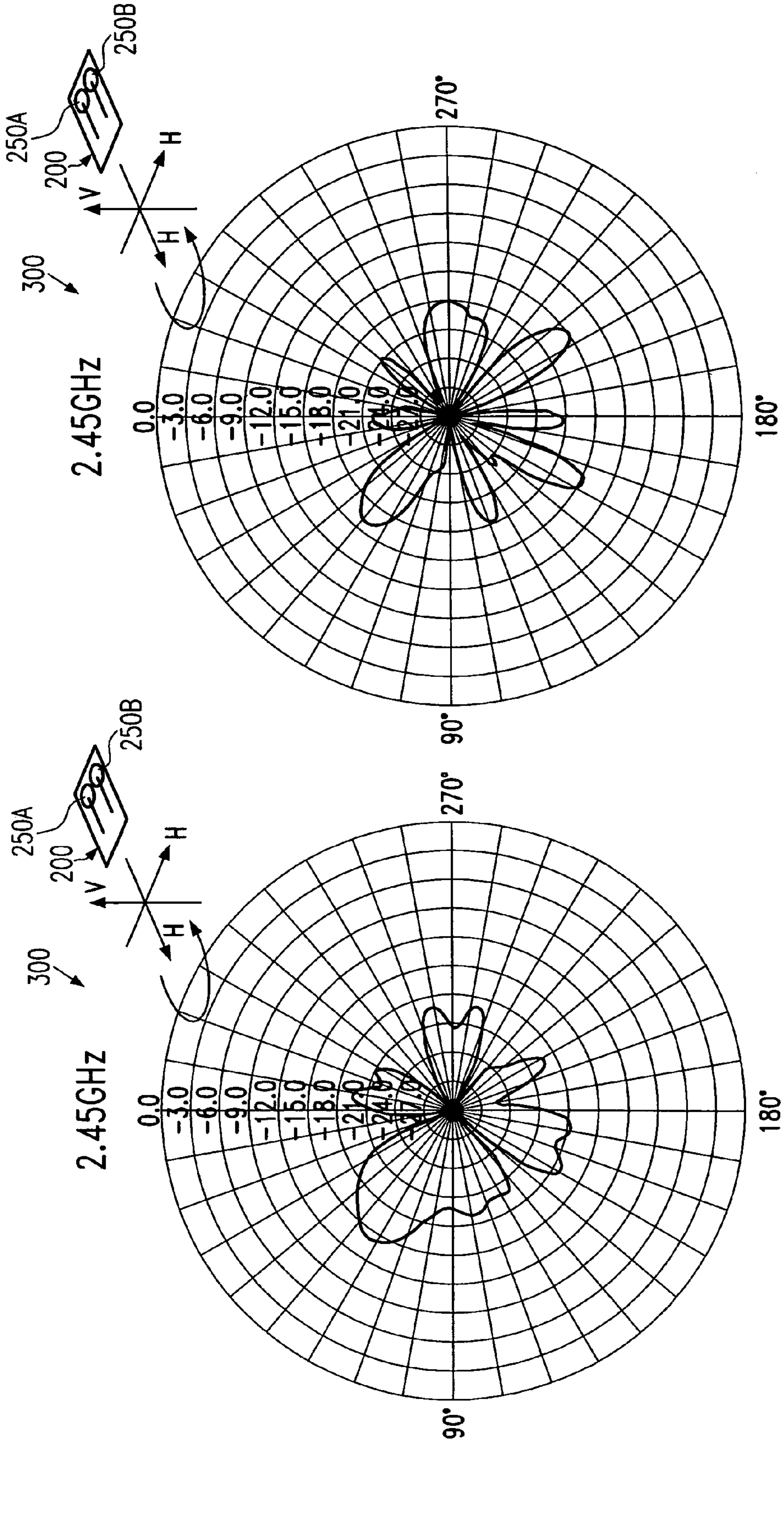
FIGS. 3*a*–3*d* schematically show diagrams representing the radiation characteristics of the dipole antennae shown in FIG. 2.

In FIG. 3*a*, on the left-hand side depicts the radiation characteristic of the antenna 250*a*, thus representing the zero degree orientation, wherein the radiation was vertically polarized and the relative angle between the transmitter and the receiver, i.e., the system 200, was varied in the horizontal direction.

The right-hand side depicts the corresponding radiation characteristic of the antenna 250*b* having an orientation of approximately 30 degrees (see FIG. 2) with respect to the first antenna 250*a*. As is evident from the results, the minimal sensitivity of the antenna 250*a* at, for instance, approximately 135 degrees may effectively be compensated for by using the antenna 250*b*. Similarly, other local minimum of the antenna gain of the first antenna 250*a* may effectively be compensated for by using, alternatively or additionally, the signal provided by the second antenna 250*b*.

Figure 3B:
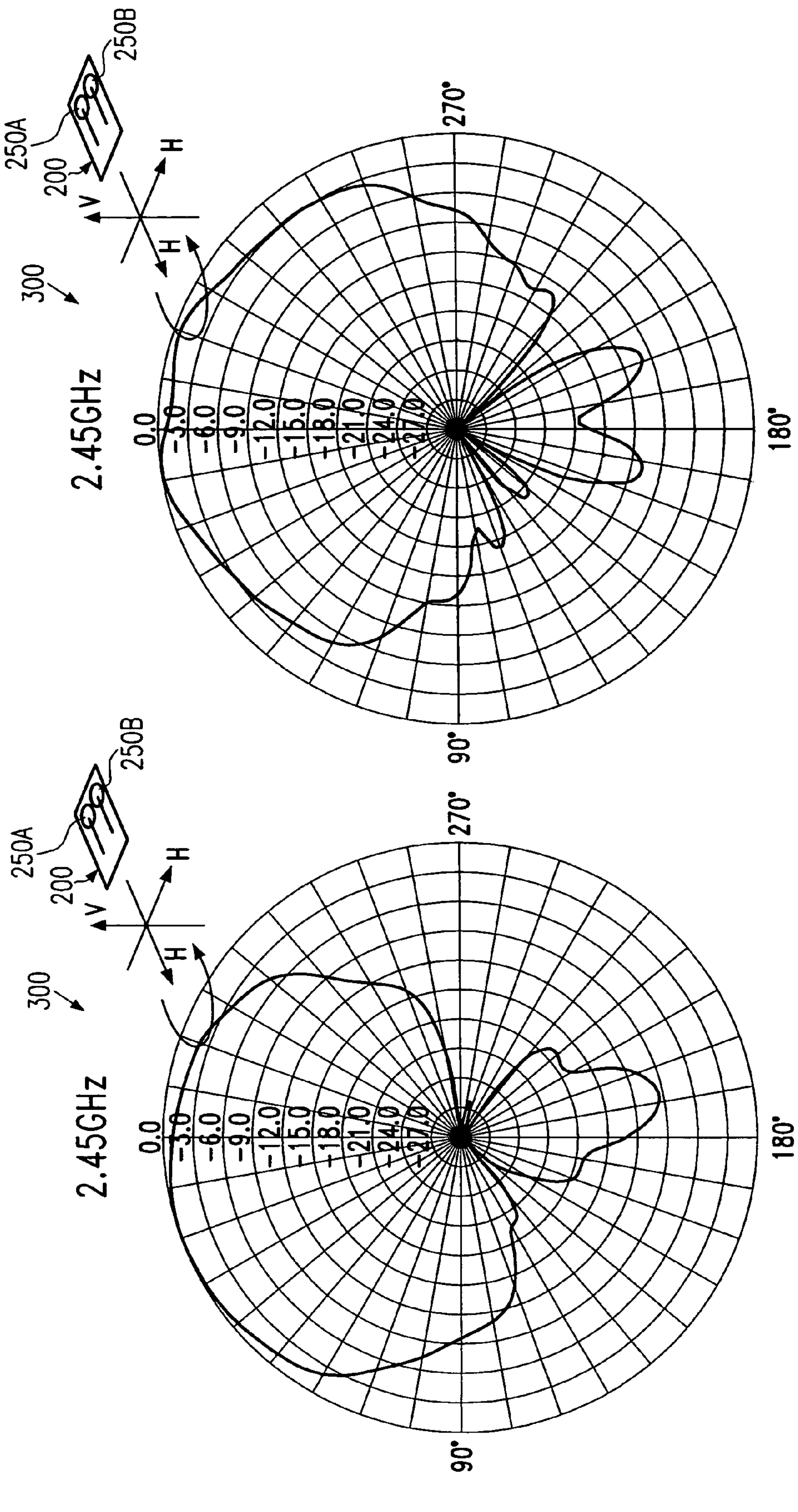

FIG. 3*b* shows on the left-hand side the corresponding radiation characteristic for a horizontally polarized radiation, while the diagram on the right-hand side illustrates the corresponding characteristic of the second antenna 250*b*. Similarly, as in the previous figures, a minimum gain of the first antenna 250*a*, for instance at 240 degrees, may be effectively compensated for by using the second antenna 250*b*. The same holds true for the other minimum at approximately 135 degrees, so that in total a high sensitivity is obtained in a substantially isotropic fashion.

Figure 3C:
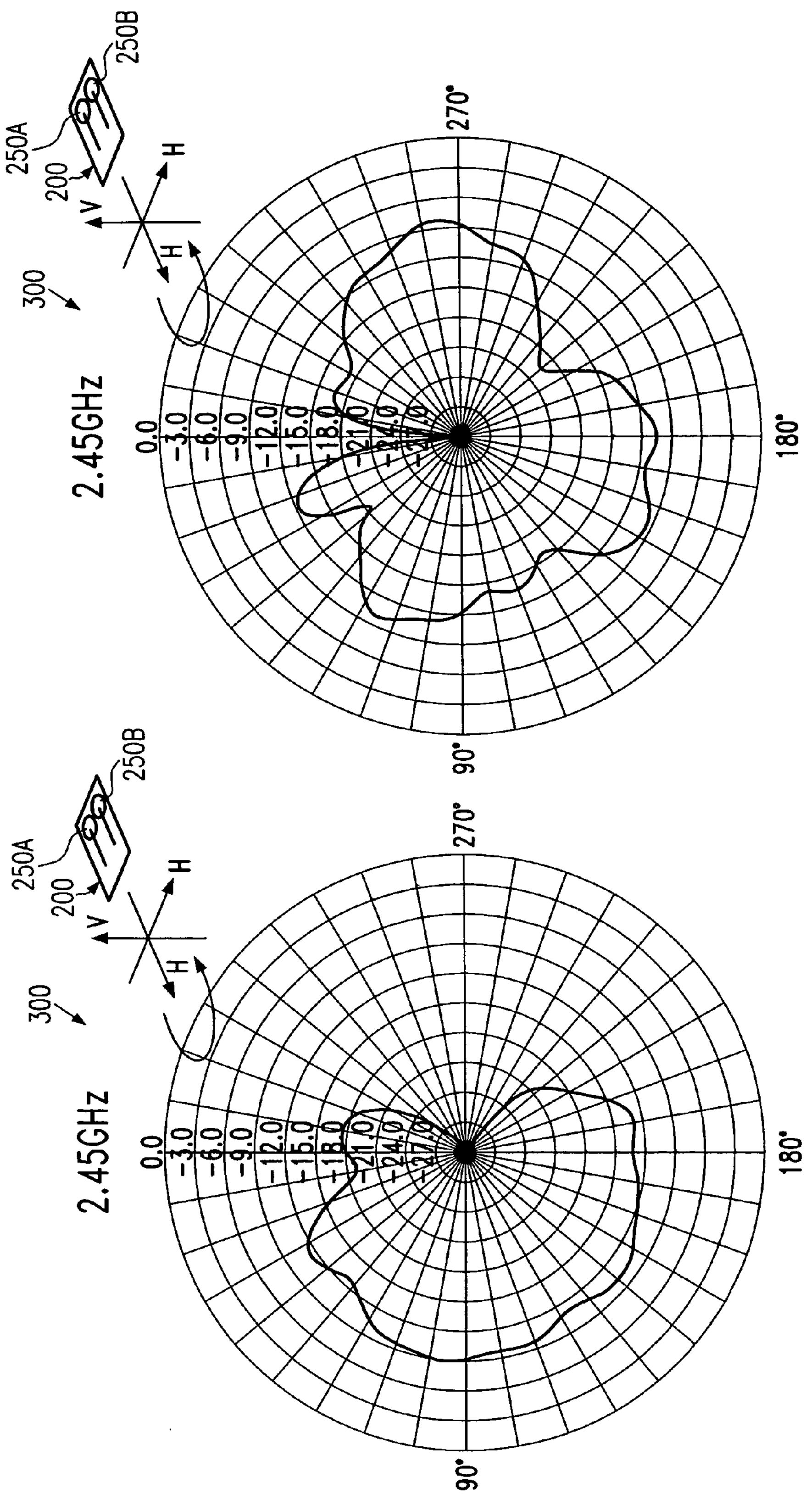

FIG. 3*c* illustrates on the left-hand side the vertical radiation distribution with a vertically polarized radiation for the antenna 250*a*, while the diagram on the right-hand side shows the corresponding measurement results for the antenna 250*b*.

Figure 3D:
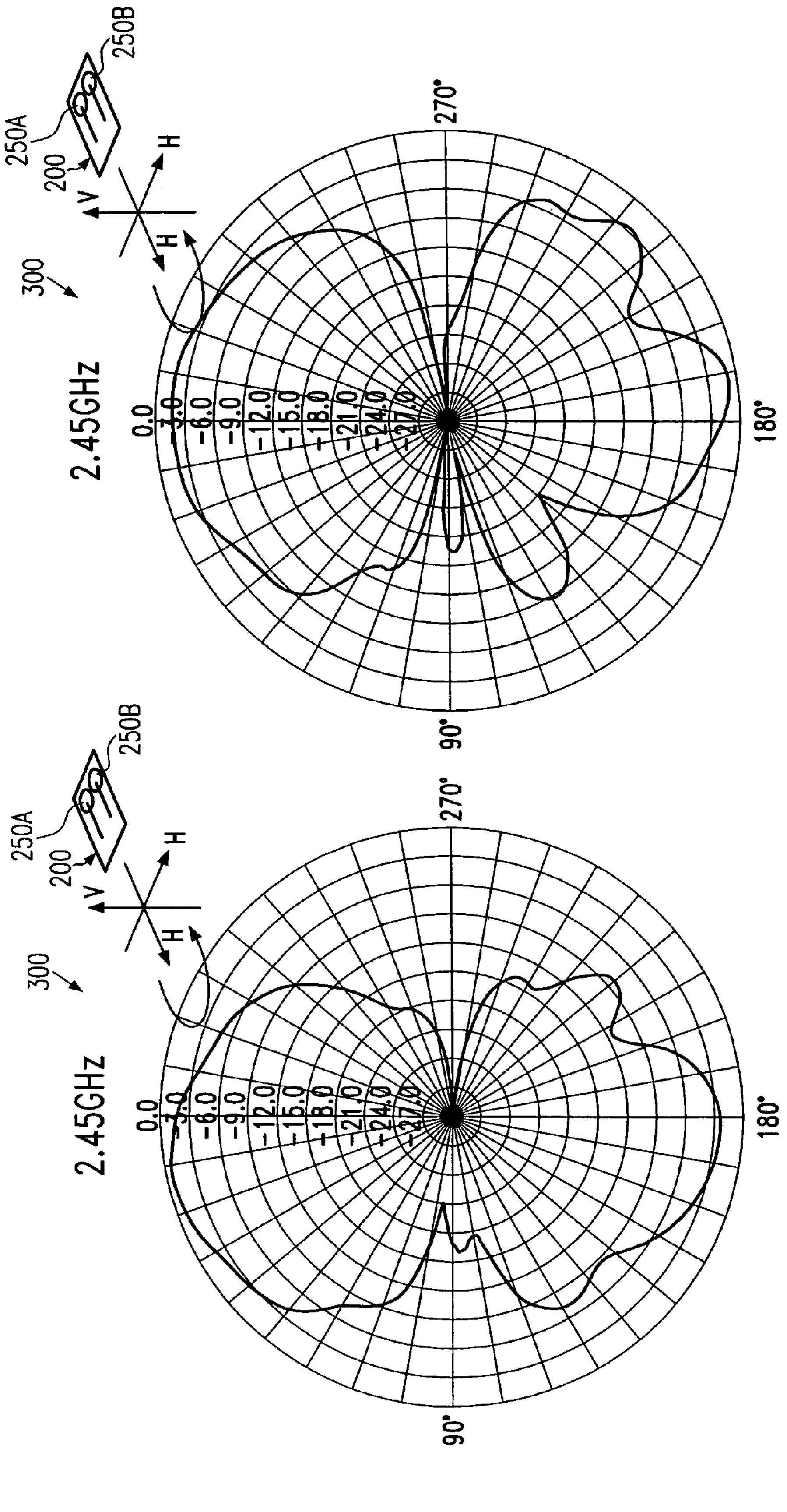

FIG. 3*d* schematically illustrates the corresponding measurement results for the vertical radiation characteristic obtained with a horizontally polarized radiation.

As a result, by providing two dipole antennae such as the antennae 100, each having a superior radiation characteristic, with a difference of orientation to each other, for example in the range of 10–50 degrees, a superior sensitivity in nearly all directions may be achieved. Hereby, a combination of two dipole antennae according to the present invention may be obtained by printing two antennae of different orientations on a single substrate, or by combining individual antennae formed on individual substrates during the manufacturing process and/or during the operation of a corresponding device, in that adjustable connector means may be provided for at least one of the individual antenna substrates to enable a corresponding adjustment of the orientation in conformity with application requirements.

Figure 4:
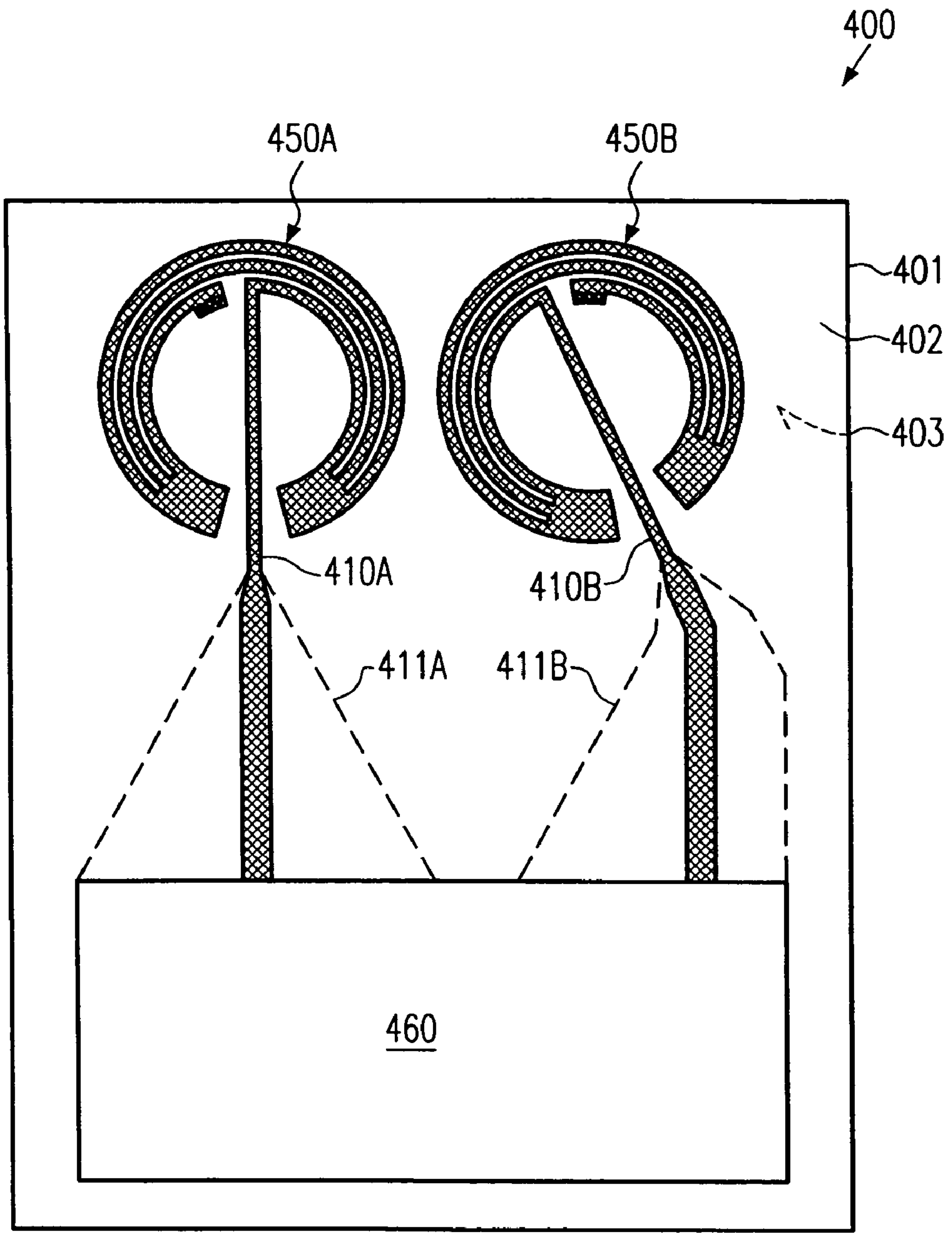
FIG. 4 schematically depicts a data communication device including a dipole antenna system as shown in FIG. 2.

FIG. 4 schematically shows a device 400 for wireless applications, such as a WLAN device, a mobile phone or the like. The device 400 comprises a substrate 401 having a first surface 402 and a second surface 403. Formed in and on the substrate 401 are a first dipole antenna 450*a* and a second dipole antenna 450*b*. Regarding the configuration of the first and second dipole antennae 450*a*, 450*b*, the same criteria apply as previously explained with reference to FIGS. 1*a*, 1*b* and 2. In particular, the dimensions of the first and second dipole antennae 450*a*, 450*b* are selected to allow an operation within a frequency range, as is required for the device 400. The dipole antennae 450*a*, 450*b* comprise respective feed lines 410*a*, 411*a* and 410*b*, 411*b*, which are formed on the first and second surfaces 402, 403. The feed lines 410*a*, 411*a*, 410*b*, 411*b* are connected to a drive/receive circuit 460, which is also formed in and on the substrate 401. The circuit 460 may comprise any high frequency and/or intermediate frequency, and/or base band circuitries, as are required to encode data to be provided to the antennae 450*a*, 450*b*, or to decode high frequency signals received from the antennae. In some embodiments, the circuit 460 may be adapted to detect and compare a signal level in the feed lines 410*a* and 410*b* to determine the respective sensitivity of each antenna at a given time. The circuit may then further be configured to selectively supply and/or receive signals to and from one of the antennae 450*a*, 450*b* having the highest signal level at that time.

In sophisticated devices, the substrate 401 may further include intermediate substrate layers (not shown) in addition to first and second surfaces 402, 403, which allow a complex circuit layout in and on the substrate 401. Hence, a complex high frequency data communication device may be provided on and in a single substrate 401, wherein the first and second antennae 450*a*, 450*b* provide the required substantially isotropic radiation characteristic. Moreover, due to the space-efficient design of the first and second antennae 450*a*, 450*b*, the wiring layout of the device 400 may be formed for the circuit 460 and the antennae 450*a*, 450*b* in a common manufacturing process followed by mounting the electronics components used in the circuit 460 without requiring any protruding portions on the high frequency side of the device 400. Hence, the device 400 may be formed as a single part, thereby contributing to an enhanced production yield and reduced production costs.

As a result, according to the present invention, a printed dipole antenna comprises bent dipole arms connected to respective feed lines formed on opposed surfaces of a substrate. In one particular embodiment, the dipole antenna is provided as a folded dipole, including two or more connector lines to provide an increased frequency range. Two of these dipole antennae may advantageously be combined to an antenna system having a superior radiation characteristic in that the two dipole antennae are arranged to have a different orientation. A corresponding circuitry may then select the antenna, which provides superior operation at a given time.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A printed dipole antenna, comprising:

a substrate having a first surface and a second surface;

a first feed line formed on said first surface;

a second feed line formed on said second surface;

a first bent dipole arm connected to said first feed line;

a second bent dipole arm connected to said second feed line by at least one contact via; and at least one connector line, one end of which is connected with a distal end of said first bent dipole arm and the other end of which is connected to a distal end of said second bent dipole arm to form a folded dipole.

2. The printed dipole antenna of claim 1, wherein said first and second feed lines are arranged in a substantially parallel fashion such that a distance therebetween is determined by a thickness of said substrate.

3. The printed dipole antenna of claim 1, wherein said at least one connector line is formed on said first surface.

4. The printed dipole antenna of claim 1, further comprising a first contact pad connecting said bent first dipole arm and said connector line and a second contact pad connecting said second bent dipole arm and said connector line.

5. The printed dipole antenna of claim 1, further comprising a second connector line connected with one end to said distal end of said first bent dipole arm and with the other end to said distal end of said second bent dipole arm.

6. The printed dipole antenna of claim 5, wherein said first and second contact pads connect to respective ends of said second connector line.

7. The printed dipole antenna of claim 1, wherein a distance between said first bent dipole arm and said at least one connector line and a distance between said second bent dipole arm and said at least one connector line is substantially constant over a length of said first and second bent dipole arms.

8. The printed dipole antenna of claim 5, wherein a distance between said at least one connector line and said second connector line is substantially constant.

9. The printed dipole antenna of claim 1, wherein said first and second bent dipole arms enclose a surface area of said first surface, whereby said first feed line is at least partially disposed in said enclosed surface area.

10. The printed dipole antenna of claim 9, wherein said first and second bent dipole arms are configured in the form of a first and a second section of a circle, respectively.

11. The printed dipole antenna of claim 10, wherein said first and second sections have substantially identical radii.

12. The printed dipole antenna of claim 9, wherein said first and second bent dipole arms include a plurality of straight line portions connected to form a curvature.

13. The printed dipole antenna of claim 1, wherein a combined length of said first and second bent dipole arms substantially corresponds to a center frequency of approximately 2.45 GHz.

14. The printed dipole antenna of claim 1, wherein a combined length of said first and second dipole arms substantially corresponds to a center frequency of approximately 5.2 GHz.

15. A printed dipole antenna system, comprising:

a substrate having a first surface and a second surface;

a first dipole antenna having a first orientation and including:

a first feed line formed on said first surface;

a second feed line formed on said second surface;

a first bent dipole arm connected to said first feed line; and a second bent dipole arm connected to said second feed line by at least one contact via;

a second dipole antenna having a second orientation and including:

a first feed line;

a second feed line;

a first bent dipole arm connected to said first feed line;

a second bent dipole arm connected to said second feed line; and at least one connector line in at least one of said first and second dipole antennae, one end of the connector line being connected with a distal end of said first bent dipole arm and the other end being connected to a distal end of said second bent dipole arm to form a folded dipole.

16. The printed dipole antenna system of claim 15, wherein said first and second bent dipole arms of said second dipole antenna are formed on said first surface.

17. The printed dipole antenna system of claim 15, wherein said first and second bent dipole arms of said second dipole antenna are formed on said second surface.

18. The printed dipole antenna system of claim 15, wherein said first and second orientations are rotated to each other within a range of approximately 10–50 degrees.

19. The printed dipole antenna system of claim 18, wherein said first and second feed lines of said first and second dipole antennae are arranged in a substantially parallel fashion such that a distance therebetween is determined by a thickness of said substrate.

20. The printed dipole antenna system of claim 18, wherein said first and second bent dipole arms enclose a surface area of said first surface, whereby said first feed line is at least partially disposed within said enclosed surface area.

21. The printed dipole antenna system of claim 20, wherein said first and second bent dipole arms are configured in the form of a first and a second section of a circle, respectively.

22. The printed dipole antenna system of claim 21, wherein said first and second sections have substantially identical radii.

23. The printed dipole antenna system of claim 20, wherein said first and second bent dipole arms include a plurality of straight line portions connected to form a curvature.

24. The printed dipole antenna system of claim 18, further comprising a detection circuitry connected to said first and second dipole antennae, the detection circuitry being configured to compare respective signal levels obtained by said first and second dipole antennae.

25. The printed dipole antenna system of claim 15, wherein said at least one connector line is formed on said first surface.

26. The printed dipole antenna system of claim 15, wherein one of said first and second dipole antennae further comprises a first contact pad connecting said first bent dipole arm and said connector line and a second contact pad connecting said second bent dipole arm and said connector line.

27. The printed dipole antenna system of claim 26, further comprising a second connector line connected with one end to said distal end of said first bent dipole arm and with the other end to said distal end of said second bent dipole arm.

28. The printed dipole antenna system of claim 27, wherein said first and second contact pads connect to respective ends of said second connector line.

29. The printed dipole antenna system of claim 15, wherein a distance between said first bent dipole arm and said at least one connector line and a distance between said second bent dipole arm and said at least one connector line is substantially constant over a length of said first and second dipole arms.

30. The printed dipole antenna system claim 29, wherein a distance between said at least one connector line and said second connector line is substantially constant.

31. A data communication device, comprising:

a substrate having a first surface and a second surface;

a first printed dipole antenna including:

a first feed line formed on said first surface;

a second feed line formed on said second surface;

a first bent dipole arm connected to said first feed line; and a second bent dipole arm connected to said second feed line by at least one contact via;

a drive/receive circuit formed on said substrate and connected to said first and second feed lines, said drive/receive circuit being configured to supply and receive high frequency signals representing data to and from said first and second feed lines; and the second printed dipole antenna, wherein an angular orientation of said second dipole antenna differs from an angular orientation of said first dipole antenna.

32. The data communication system of claim 31, wherein said second dipole antenna is substantially identical in configuration to said first dipole antenna.

33. The data communication system of claim 31, further comprising at least one connector line, one end of which is connected with a distal end of said first bent dipole arm and the other end of which is connected to a distal end of said second bent dipole arm to form a folded dipole.

* * * * *